United States Patent [19]

Miller

[11] Patent Number: 4,526,194
[45] Date of Patent: Jul. 2, 1985

[54] TAMPER-PROOF VALVE

[75] Inventor: Frank J. Miller, Muskego, Wis.

[73] Assignee: Milwaukee Valve Company, Milwaukee, Wis.

[21] Appl. No.: 540,099

[22] Filed: Oct. 7, 1983

Related U.S. Application Data

[63] Continuation of Ser. No. 252,160, Apr. 8, 1981.

[51] Int. Cl.³ .............................................. F16K 35/00
[52] U.S. Cl. ..................................... 137/385; 137/797; 251/89; 251/297
[58] Field of Search .................... 251/297, 89, 96, 111; 137/385, 797; 70/175, 176

[56] References Cited

U.S. PATENT DOCUMENTS

| | | | |
|---|---|---|---|
| 2,438,672 | 3/1948 | Margrave | 251/297 |
| 2,493,966 | 1/1950 | Hartley | 251/297 |
| 2,540,481 | 11/1970 | Peters, Jr. | 137/797 |
| 3,648,970 | 3/1972 | Hartmann et al. | 137/385 |
| 3,902,697 | 9/1975 | Robinson | 251/306 |

FOREIGN PATENT DOCUMENTS 1425891  2/1976  United Kingdom ................. 251/96

Primary Examiner—A. Michael Chambers
Attorney, Agent, or Firm—Michael, Best & Friedrich

[57] ABSTRACT

A butterfly valve or a similar quarter-turn valve is provided with a locking mechanism which permits the disc assembly to be rotated from the open position to the closed position, but prevents the disc assembly from being rotated back to the open position. The locking mechanism includes a cam carried on a rotatable stem supporting the valve disc assembly. The cam has a camming surface including a detent notch situated at a location corresponding to the open position of the disc assembly. A plunger, which is spring loaded into engagement with the camming surface, is urged into the detent notch when the disc assembly is rotated from the open to the closed position and prevents the disc assembly from being rotated back to the open position.

12 Claims, 8 Drawing Figures

TAMPER-PROOF VALVE

This application is a continuation of application Ser. No. 252,160, filed 04/08/81, now abandoned.

BACKGROUND OF THE INVENTION

This invention relates to tamper-proof valves and, more particularly, to valves having a rotatable valve member or a rotatable operator, such as butterfly valves, ball valves and plug cocks, including a locking mechanism for permitting the valve to be opened or closed, but preventing the valve member from being returned to its former position.

Quarter-turn valves may be used in applications where it is desirable for them to be designed so that, in the event the valve is improperly closed or opened, it cannot be re-opened or re-closed without special tools or must be replaced. For instance, gas supply lines to households and business establishments commonly include a shut-off valve upstream of the supply meter. An unscrupulous user wishing to by-pass the supply meter would have to close that valve to make the necessary modifications. If a shut-off valve of the above design were provided by the gas supply company, a user closing the valve would have to contact that company, either to open the valve with a special tool or to replace it, before gas service could start again.

SUMMARY OF THE INVENTION

One of the objects of the invention is to provide a valve including a rotatable valve member and a simple, low cost and tamper-proof locking mechanism capable of permitting the valve member to be rotated from one position to another but preventing it from being rotated back to the former position.

Another of the objects of the invention is to provide such a valve wherein the locking mechanism includes the further capability of permitting the valve member to be opened and closed, or closed and opened, one or more times before the locking mechanism becomes effective.

A further of the objects of the invention is to provide a valve described in either one of the two preceding paragraphs including means for positively insuring that the valve member cannot be rotated back to its former position even though an excessive force is applied on the operating handle.

Other objects, aspects and advantages of the invention will become apparent to those skilled in the art upon reviewing the following detailed description, of the drawing and the appended claims.

The locking mechanism provided by the invention is mounted on the valve body and cooperates with a rotatable stem carrying a valve member to permit the valve member to be rotated from the open to the closed position, or from the closed to the open position, but prevents the valve member from being rotated back to its former position.

In one embodiment, the locking mechanism includes a cam carried by the stem for common rotation therewith and having a camming surface including a detent notch situated at a location corresponding to the open or closed position of the valve member. The locking mechanism also includes a plunger mounted on the valve body for slidable movement relative to the cam and a biasing means, such as a compression spring, for urging the plunger into engagement with the camming surface of the cam. The plunger rides against the camming surface during movement of the valve member from one position to the other and is urged into the detent notch upon reaching the latter position to prevent the valve member from being rotated back to its former position.

In one embodiment, an operating handle is mounted on one end of the stem extending exteriorly of the body and the stem is provided with a weakened section which shears to prevent the value member from being rotated back to its former position by applying excessive force on the operating handle.

In one embodiment, the cam is provided with at least one ratchet notch which is circumferentially spaced from the detent notch and is arranged so that, when the plunger is located therein, the valve member can be rotated in one direction but not in the opposite direction. With this arrangement, the valve member can be open and closed, or closed and opened, at least once before the locking mechanism becomes effective.

A BRIEF DESCRIPTION OF THE DRAWINGS

DESCRIPTION OF THE PREFERRED EMBODIMENTS

While the tamper-proof locking mechanism of the invention is adaptable for use with valves having a rotatable valve member or a rotatable operator, including ball valves, plug cocks and lever-operated gate valves, it will be described in connection with a butterfly valve.

Figure 1:
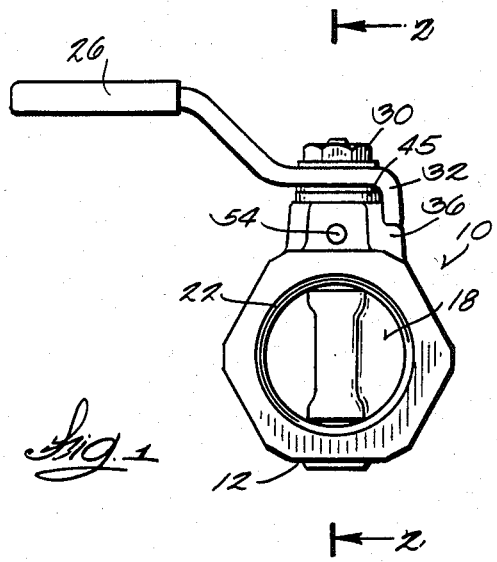
FIG. 1 is an end elevational view of a butterfly valve incorporating a locking mechanism of the invention, shown with the valve disc assembly in the closed position.
Figure 2:
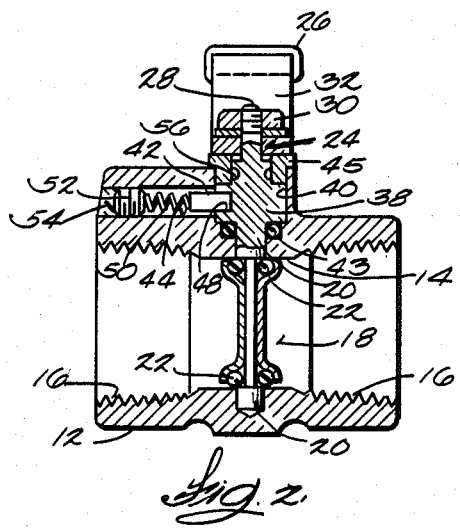
FIG. 2 is a sectional view taken generally along line 2—2 in FIG. 1.

Illustrated in FIGS. 1-4 is a butterfly valve 10 designed for use in a gas supply line to a household or business establishment or similar applications where a tamper-proof feature is advantageous. The butterfly valve 10 includes a body 12 having a generally cylindrical bore 14 defining a flow passage therethrough and internal threads 16 in the opposite ends for connection in a gas supply system, for example, upstream of a supply meter (not shown). Disposed in the flow passage is a valve disc assembly 18 carried on a stem 20 which extends transversely of the flow passage and is rotatably mounted in the body 12 for rotatable movement of the disc assembly 18 between a closed position generally perpendicular to the direction of flow is illustrated in FIGS. 1 and 2 and an open position generally parallel to the direction of flow.

The disc assembly 18 carries a peripheral sealing ring 22 which compressingly engages the bore 14 to provide a leak-tight seal when the disc assembly 18 is in the closed position. The valve body 12, the disc assembly 18 and the sealing ring 22 preferably are generally constructed in the manner described in U.S. Pat. No. 3,902,697. That is, the sealing ring 22 has a triple O-ring construction and is disposed between two disc halves. Each of the disc halves includes a peripheral flange which, when the disc halves are assembled in a sandwich construction and are operably connected to the stem 20, cooperate to capture the sealing ring 22 therebetween with a portion of the sealing ring extending radially outwardly from the periphery of the disc halves.

The stem 20 has an outer end portion 24 extending exteriorly of the body 12. The disc assembly 18 is rotated between the open and closed positions by a handle 26 mounted on the outer end 24 of the stem 20. In the specific construction illustrated, the handle 26 includes a flat-sided aperture which fits over a threaded, flat-sided portion 28 on the outer end 24 of the stem 20. The handle 26 is held in place by a nut 30 threaded onto the stem portion 28. The handle 26 also includes an inturned tab 32 which engages projecting stops 34 and 36 located 90° apart on the body 12 at locations corresponding to the open and closed positions of the disc assembly, respectively.

The invention provides a locking mechanism which cooperates with the stem 20 to permit the disc assembly to be rotated from one position to the other but prevents it from being rotated back to the former position. In the specific construction illustrated in FIGS. 1-4, the locking mechanism includes a cam 38 which is received in an annular recess 40 in the body 12 and is carried by the stem 20 for common rotation therewith. The locking mechanism also includes a spring-loaded pin or plunger 42 slidably disposed in a bore 44 in the body 12 extending in a direction transversely to the stem 20. An O-ring 43 seated in the bottom of the recess 40 serves as a back-up stem seal. The cam 38 is covered by a plug 45 which surrounds the outer end of the stem 20 and is press fitted into the recess 40.

The cam 38 has a camming surface 46 including a detent notch 48 which receives the plunger 42 and is situated at a location corresponding to the closed position of the disc assembly 18. The plunger 42 is urged into engagement with the cam 38 by a small compression spring 50. One end of the spring 50 is connected to or bears against the plunger 42 and the other end bears against a spring retainer, such as a set screw 52 threaded into the bore.

Figure 4:
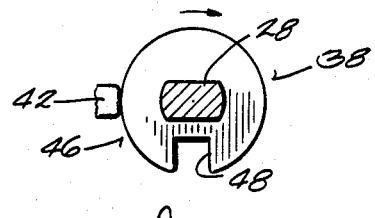
FIG. 4 is an enlarged top plan view of the cam and plunger in the valve illustrated in FIG. 1, showing the relationship of these components when the disc assembly is in the open position.
Figure 3:
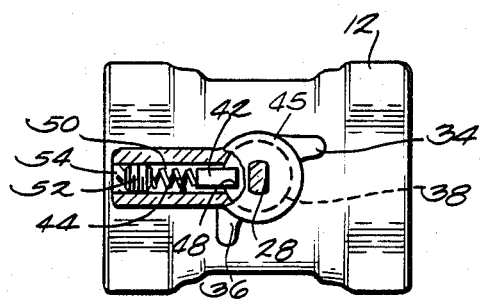
FIG. 3 is a partially broken away, top plan view of the valve illustrated in FIG. 1, shown with the operating handle removed.

When the disc assembly 18 is in the open position, the plunger 42 engages the camming surface 46 at a location approximately 90° from the detent notch 48 as illustrated in FIG. 4, permitting the disc assembly 18 to be rotated in the clockwise direction (as viewed in FIG. 4) to the closed position. As the disc assembly 18 is rotated through 90° from the open position toward the closed position, the plunger 42 rides along the camming surface 46. Once the disc assembly 18 reaches the open position, the spring 50 urges the plunger 42 into the detent notch 48 as illustrated in FIG. 3, preventing subsequent rotation of the disc assembly 18 unless the plunger 42 is retracted from the detent notch 48.

The locking mechanism can be designed to permit resetting of the valve only with special tools or obscured in a manner so that operating parts cannot be detected by a user. For instance, the set screw 52 can be arranged to require an allen wrench of special design, in which case the set screw 52 cannot be unthreaded to retract the plunger 42 without such a special allen wrench. Alternately, the cavity in the bore 44 between the outer end of the set screw 52 and the exterior surface of the body 12 can be filled with an opaque epoxy material 54 as illustrated, or a plug which is press fitted into the bore 44, to obscure the set screw and/or prevent its removal by the user. The cam 38 is hidden from view by the plug 45. In the event the valve is closed, the gas supply company must be called, either to reset the locking mechanism and return the disc assembly 18 to the open position or to replace the valve 10. Consequently, a user cannot tamper with the valve without knowledge of the gas supply company.

As further assurance against the disc assembly 18 being re-opened, the stem 20 can be provided with a weakened section which shears in the event an excessive amount of torque is applied on the handle 26. In the specific construction illustrated (FIG. 2), an annular groove 56 is formed in the outer end of the stem 20. The groove 56 preferably is located within the plug 45 so that, after the outer end of the stem 20 and the handle 26 has sheared off, no part of the stem 20 is protruding for gripping with a wrench or the like.

While the cam 38 can be formed as a separate part, it preferably is formed with the stem 20 as a one-piece unit in order to minimize fabrication and assembly costs.

In the event the installer wishes to open and close the valve for leak testing and the like after installation, the set screw 52, the spring 50 and the plunger 42 can be removed. After the leak tests have been completed, the handle 26 is moved to the open position, the plunger 42, the spring 50 and the set screw 52 are assembled into the bore 44 and the cavity at the end of the bore 44 is covered as described above. If the valve thereafter is fully closed, the locking mechanism operates as described above and the valve cannot re-opened.

FIGS. 5-8 illustrate a cam arrangement which permits the disc assembly 18 to be closed and opened one time with the locking mechanism assembled in place before the locking mechanism becomes effective to prevent re-opening. In this embodiment, all of the components of the valve, other than the cam 60, can be constructed and operate in substantially the same manner as described above in connection with the embodiment illustrated in FIGS. 1-4. The cam 60 includes a detent notch 62 and two ratchet notches 64 and 66 circumferentially spaced 90° and 180°, respectively, from the detent notch 62. The ratchet notches 64 and 66 are formed with a ramp surface 68 to permit the cam 60, and thus the disc assembly 18, to be rotated in a clockwise direction, but not in the counterclockwise direction (as viewed in FIGS. 5-8) after the plunger 42 has been received therein.

Figure 5:
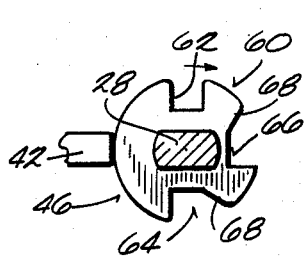
FIGS. 5-8 are top plan views similar to FIG. 4 of an alternate arrangement for the cam, showing the relationship of the cam and plunger at different positions of the disc assembly.
Figure 6:
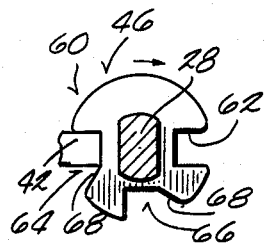
Figure 7:
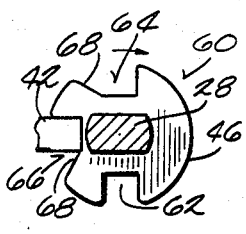
Figure 8:
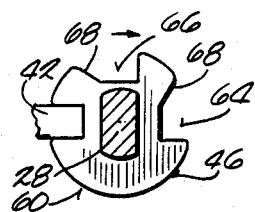

The valve is shipped with the disc assembly in the open position with the cam 60 in the position illustrated in FIG. 5, i.e., the detent notch 62 is 270° from the plunger 42 and the first ratchet notch 64 is 90° from the plunger 42. The plunger 42 is received in the first ratchet notch 64 when the disc assembly 18 is closed by rotating the handle 26 90° in the clockwise direction as illustrated in FIG. 6. The first ratchet notch 64 prevents the disc assembly 18 from being subsequently re-opened by rotating the handle 26 counterclockwise, but permits it to be re-opened by rotating the handle 26 clockwise. The plunger 42 is received in the second ratchet notch 66 when the disc assembly 18 is thus re-opened as illustrated in FIG. 7. The second ratchet notch 66 prevents the disc assembly 18 from being closed by rotating the handle 26 counterclockwise but permits it to be closed by rotating the handle 26 clockwise. If the disc assembly 18 is subsequently closed, the plunger 42 is received in the detent notch 62 to prevent rotation of the disc assembly in either direction as illustrated in FIG. 8. In this embodiment, the body 12 is formed without the external stop 36 illustrated in FIGS. 1 and 3 so that the handle 26 can be rotated 270°.

With this arrangement, the locking mechanism can be completely assembled prior to installation of the valve and the valve closed and opened one time after installation for leak testing or the like.

For applications where it is desirable for the locking mechanism to prevent a normally closed valve from being re-closed after opening, the detent notch on the cam is situated at a position corresponding to the open position of the disc assembly. Otherwise, the locking mechanism and the valve itself can be constructed in substantially the same manner.

From the above description, one skilled in the art can easily ascertain the essential characteristics of the invention and, without departing from the scope and spirit thereof, can make various changes and modifications to adapt the invention to various usages and conditions.

I claim:

1. A valve comprising
   a body having a flow passage extending therethrough;
   a stem rotatably mounted in said body;
   a valve member supported on said stem and disposed in said flow passage for rotatable movement through 90° between open and closed positions;
   operating means connected to said stem and movable by an operator to rotate said valve member between the open and closed positions; and
   a locking mechanism mounted in the interior of said body and cooperating with said stem for permitting an operator, by moving said operating means without axial displacement of said stem and without moving any other separate part of said valve, to rotate said valve member 90° in a first direction from a starting position to a locked position, which is either the closed position or the open position depending on the starting position and for preventing subsequent rotation of said valve member after an initial rotation of 90° from the starting position, either in a second direction opposite to said first direction or in said first direction from the locked position back to the starting position, said locking mechanism including a cam having a camming surface including a detent notch situated at a location corresponding to the locked position of said valve member,
   a plunger mounted on the other of said stem and said body for slidable movement relative to and engagement with said camming surface, and
   means for urging said plunger into engagement with said camming surface, whereby said plunger rides against said camming surface during rotation of said valve member from the starting position toward the locked position in the first direction and is urged into said detent notch when said valve member reaches the locked position.

2. A valve according to claim 1 wherein
   said cam is carried on said stem for common rotation therewith and said plunger is mounted in said body;
   said valve body includes an annular recess which surrounds said stem and receives said cam and a bore which extends in a direction transversely to said stem and receives said plunger; and
   said biasing means includes a compression spring disposed in said bore with one connected to said plunger and a spring retainer which is mounted on said body and bears against the opposite end of said spring.

3. A valve according to claim 2 wherein said spring retainer is removably mounted in said bore.

4. A valve according to claim 2 wherein said stem and said cam is a one-piece unit.

5. A valve according to claim 1 wherein
   one end of said stem extends exteriorly of said body;
   said operating means includes a handle connected to said one end of said stem; and
   said stem includes a weakened section for causing said stem to shear in the event an excessive amount of torque is applied thereon by said handle after said valve member has been rotated to the locked position.

6. A valve according to claim 1 wherein said camming surface further includes at least one ratchet notch circumferentially spaced from said detent notch for receiving said plunger, said ratchet notch being arranged so that, when said plunger is located therein, said valve member can be rotated from the open position or the closed position to the starting position in said first direction but not in said second direction.

7. A butterfly valve comprising
   a body having a flow passage extending therethrough;
   a stem rotatably mounted in said body with one end extending exteriorly of said body;
   a disc assembly mounted on said stem and disposed in said flow passage for rotatable movement through 90° between open and closed positions;
   a handle mounted on said one end of said stem and movable by an operator to rotate said disc assembly between the open and closed positions; and
   a locking mechanism for permitting an operator, by moving said handle without axial displacement of said stem and without moving any other separate part on said valve, to rotate said disc assembly 90° in a first direction from a starting position to either the closed position or the open position, depending on the starting position and for preventing subsequent rotation of said disc assembly after an initial rotation of 90° from the starting position, either in a second direction opposite to said first direction or in said first direction from the locked position back to the starting position, said locking mechansim including
   a cam carried by said stem interiorly of said body for common rotation therewith and having a detent notch situated at a location corresponding to the locked position of said disc assembly,
   a plunger mounted in said body for slidable movement relative to and engagement with said camming surface,
   means for urging said plunger into engagement with said camming surface, whereby said plunger rides against said camming surface during rotation of said disc assembly from the starting position toward the locked position in said first direction and is urged into said detent notch when said disc assembly reaches the locked position to prevent said disc assembly from being rotated in either of said first and second directions back to the starting position.

8. A butterfly valve according to claim 7 wherein said body includes an annular recess which surrounds said stem and receives said cam and a bore which extends in a direction transversely to said stem and receives said plunger; and
    said biasing means includes a compression spring disposed in said bore with one end connected to said plunger and a spring retainer which is mounted on said body and bears against the opposite end of said spring.

9. A butterfly valve according to claim 8 wherein said stem includes a weakened section for causing said stem to shear in the event an excessive amount of torque is applied thereon by said handle after said disc assembly has been rotated to the locked position.

10. A butterfly valve according to claim 7 wherein said camming surface further includes at least one ratchet notch circumferentially spaced from said detent notch for receiving said plunger, said ratchet notch being arranged so that, when said plunger is located therein, said disc assembly can be rotated from the open position or the closed position to the starting position in said first direction but not in said second direction.

11. A valve comprising
    a body having a flow passage extending therethrough;
    a stem rotatably mounted in said body;
    a valve member supported on said stem and disposed in said flow passage for rotatable movement through 90° between open and closed positions;
    operating means connected to said stem and movable by an operator to rotate said valve member between the open and closed positions;
    a locking mechanism mounted in the interior of said body and cooperating with said stem for permitting an operator, by moving said operating means without axial displacement of said stem and without moving any other separate part on said valve, to rotate said valve member 90° in a first direction from a starting position to a locked position, which is either the closed position or the open position depending on the starting position, and for preventing subsequent rotation of said valve member after an initial rotation of 90° from the starting position, either in a second direction opposite to said first direction or in said first direction from the locked position back to the starting position, said locking mechanism including
    a cam carried by said stem interiorly of said body for common rotation therewith and having a camming surface including a detent notch situated at a location corresponding to the locked position of said valve member,
    a plunger mounted in said body for slidable movement relative to and engagement with said camming surface, and
    means for urging said plunger into engagement with said camming surface, whereby said plunger rides against said camming surface during rotation of said valve member from the starting position toward the locked position in said first direction and is urged into said detent notch when said valve member reaches the locked position to prevent said valve member from being rotated in either of said first and second directions back to the starting position, said camming surface further including at least one ratchet notch circumferentially spaced from said detent notch for receiving said plunger, said ratchet notch being arranged so that, when said plunger is located therein, said valve member can be rotated from the open position or the closed position to the starting position in said first direction but not in said second direction.

12. A butterfly valve comprising
    a body having a flow passage extending therethrough;
    a stem rotatably mounted in said body with one end extending exteriorly of said body;
    a disc assembly mounted on said stem and disposed in said flow passage for rotatable movement through 90° between open and closed positions;
    a handle mounted on said one end of said stem and movable by an operator to rotate said disc assembly 90° between the open and closed positions;
    a locking mechanism for permitting an operator, by moving said handle without axial displacement of said stem and without moving any other separate part of said valve, to rotate said disc assembly 90° in a first direction from a starting position to either the closed position or the open position, depending on the starting position, and for preventing subsequent rotation of said disc assembly after an initial rotation 90°, either in a second direction opposite to said first direction or in said first direction from the locked position back to the starting position, said locking mechanism including
    a cam carried by said stem interiorly of said body for common rotation therewith and having a detent notch situated at a location corresponding to the locked position of said disc assembly,
    a plunger mounted in said body for slidable movement relative to and engagement with said camming surface,
    means for urging said plunger into engagement with said camming surface, whereby said plunger rides against said camming surface during rotation of said disc assembly from the starting position toward the locked position in said first direction and is urged into said detent notch when said disc assembly reaches the locked position to prevent said disc assembly from being rotated in either of said first and second directions back to the starting position, said camming further including at least one ratchet notch circumferentially spaced from said detent notch for receiving said plunger, said ratchet notch being arranged so that, when said plunger is located therein, said disc assembly can be rotated from open position or the closed position to the starting position in said first direction but not in said second direction.

* * * * *